United States Patent
Niroula et al.

(10) Patent No.: US 12,093,128 B2
(45) Date of Patent: Sep. 17, 2024

(54) SYSTEMS AND METHODS FOR EFFICIENT ERROR MITIGATION IN QUANTUM CIRCUIT EXECUTION USING PARITY CHECKS AND CLASSICAL FEEDBACK

(71) Applicant: JPMORGAN CHASE BANK, N.A., New York, NY (US)

(72) Inventors: Pradeep Niroula, College Park, MD (US); Ruslan Shaydulin, New York, NY (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1 day.

(21) Appl. No.: 18/060,235

(22) Filed: Nov. 30, 2022

(65) Prior Publication Data

US 2024/0176694 A1    May 30, 2024

(51) Int. Cl.
*H03M 13/00*  (2006.01)
*G06F 11/10*  (2006.01)

(52) U.S. Cl.
CPC .................................. *G06F 11/10* (2013.01)

(58) Field of Classification Search
CPC ....... G06F 11/10; G06F 11/102; G06F 11/108
See application file for complete search history.

(56) References Cited

U.S. PATENT DOCUMENTS

| | | | | |
|---|---|---|---|---|
| 7,461,323 B2 * | 12/2008 | Matsumoto | ........... | H04L 9/0858 |
| | | | | 714/780 |
| 7,781,754 B2 * | 8/2010 | Loss | ...................... | B82Y 10/00 |
| | | | | 257/E21.089 |
| 9,978,020 B1 * | 5/2018 | Gambetta | .............. | G06N 10/00 |
| 10,599,989 B2 * | 3/2020 | Bravyi | ..................... | G06F 17/16 |
| 11,037,068 B2 * | 6/2021 | Girvin | ..................... | G06F 11/10 |
| 11,367,013 B2 * | 6/2022 | Pant | ....................... | G06N 10/00 |

* cited by examiner

*Primary Examiner* — Esaw T Abraham
(74) *Attorney, Agent, or Firm* — GREENBERG TRAURIG LLP (57) ABSTRACT

Systems and methods for efficient error mitigation in quantum circuit execution using parity checks and classical feedback are disclosed. A method may include a quantum computer: executing a quantum optimization algorithm comprising measurement points for measuring a quantum state parity, and termination instructions for stopping execution of the quantum optimization algorithm; preparing the quantum state; executing a first step of the quantum optimization algorithm; measuring a first parity of the quantum state; returning the first parity to a classical computer program; executing a second step of the quantum optimization algorithm; measuring a second parity of the quantum state; returning the second parity to the classical computer program that is configured to compare the first parity and the second parity; receiving an instruction to execute the termination instructions from the classical computer program in response to first parity and the second parity being different; and executing the termination instructions.

15 Claims, 4 Drawing Sheets

SYSTEMS AND METHODS FOR EFFICIENT ERROR MITIGATION IN QUANTUM CIRCUIT EXECUTION USING PARITY CHECKS AND CLASSICAL FEEDBACK

BACKGROUND OF THE INVENTION

1. Field of the Invention

Embodiments are generally directed to systems and methods for efficient error mitigation in quantum circuit execution using parity checks and classical feedback.

2. Description of the Related Art

Solving optimization algorithms, like portfolio optimization, is a promising use case of quantum computers. Because of experimental or hardware noise, quantum algorithms often fail to reach optimal solutions. To counter the accumulation of hardware noise, error mitigation techniques are used to discard bad or corrupted data. This is often referred to as "post-selection." Error detection and mitigation techniques based on rejecting bad samples require the quantum circuit to be fully executed before the data can be processed, which is costly in time and money.

SUMMARY OF THE INVENTION

Systems and methods for efficient error mitigation in quantum circuit execution using parity checks and classical feedback are disclosed. According to one embodiment, a method for efficient error mitigation in quantum circuit execution may include: (1) executing, by a quantum computer, a quantum circuit for a quantum optimization algorithm, the quantum circuit comprising a plurality of measurement points for measuring a parity of a quantum state, and termination instructions for stopping execution of the quantum optimization algorithm; (2) preparing, by the quantum computer, the quantum state; (3) executing, by the quantum computer, a first step of the quantum optimization algorithm; (4) measuring, by the quantum computer, a first parity of the quantum state; (5) returning, by the quantum computer, the first parity to a classical computer program; (6) executing, by the quantum computer, a second step of the quantum optimization algorithm; (7) measuring, by the quantum computer, a second parity of the quantum state; (8) returning, by the quantum computer, the second parity to the classical computer program, wherein the classical computer program is configured to compare the first parity and the second parity; (9) receiving, by the quantum computer, an instruction to execute the termination instructions from the classical computer program in response to first parity and the second parity being different; and (10) executing, by the quantum computer, the termination instructions.

In one embodiment, the quantum state is a Dicke state.

In one embodiment, the quantum computer measures the first parity and the second parity by: initializing an auxiliary qubit; applying a Hadamard gate; applying a control on the auxiliary qubit; applying a Hadamard gate a second time; and measuring the auxiliary qubit.

In one embodiment, the quantum optimization algorithm comprises the Quantum Approximate Optimization Algorithm.

In one embodiment, the method may also include continuing to execute, by the quantum computer, the quantum optimization algorithm in response to the first parity of the quantum state and the second parity of the quantum state being the same.

According to another embodiment, a method for efficient error mitigation in quantum circuit execution may include: (1) executing, by a quantum computer, a quantum circuit for a quantum optimization algorithm, the quantum circuit comprising a plurality of measurement points for measuring a parity of a quantum state, and termination instructions for stopping execution of the quantum optimization algorithm; (2) measuring, by the quantum computer, a first parity of the quantum state; (3) returning, by the quantum computer, the first parity to a classical computer program; (4) executing, by the quantum computer, a phase operator; (5) measuring, by the quantum computer, a second parity of the quantum state; (6) returning, by the quantum computer, the second parity to the classical computer program, wherein the classical computer program is configured to compare the first parity and the second parity; (7) receiving, by the quantum computer, an instruction to execute the termination instructions from the classical computer program in response to first parity and the second parity being different; and (8) executing, by the quantum computer, the termination instructions.

In one embodiment, the phase operator comprises a product of ZZ gates.

In one embodiment, the first parity of the quantum state and the second parity of the quantum state are measured by an operator comprising a tensor product of single-qubit Pauli Z operators.

In one embodiment, the quantum optimization algorithm comprises the Quantum Approximate Optimization Algorithm.

In one embodiment, the method may also include continuing to execute, by the quantum computer, the quantum optimization algorithm in response to the first parity of the quantum state and the second parity of the quantum state being unchanged.

According to another embodiment, a method for efficient error mitigation in quantum circuit execution may include: (1) executing, by a quantum computer, a first step in a quantum optimization algorithm comprising measurement points for measuring a parity of integer variable states and termination instructions for stopping execution of the quantum optimization algorithm, wherein integers in the quantum optimization algorithm are represented using one-hot encoding; (2) measuring, by the quantum computer, a parity for each of the integer variables; (3) returning, by the quantum computer, the parities to a classical computer program, wherein the classical computer program is configured to evaluate the parities; (4) receiving, by the quantum computer, an instruction to execute the termination instructions from the classical computer program in response to one of the parities having a value other than a first value; and (5) executing, by the quantum computer, the termination instructions.

In one embodiment, the value is −1.

In one embodiment, the quantum optimization algorithm comprises the Quantum Approximate Optimization Algorithm.

In one embodiment, the parity for each of the integer variables is measured using an operator comprising a tensor product of single-qubit Pauli Z operators.

In one embodiment, the method may also include continuing to execute, by the quantum computer, the quantum optimization algorithm in response to the parities having the first value.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments generally relate to systems and methods for efficient error mitigation in quantum circuit execution using parity checks and classical feedback.

Embodiments allow for the detection of errors early in the execution. When an error is detected, execution is terminated and then restarted. This conserves quantum computing resources by avoiding the running the remainder of the execution.

For example, embodiments may terminate the execution of a quantum optimization algorithm that is executing on a quantum computer upon discovery of an error from a measurement, such as the measurement outcome of a parity check. The user may specify the particular optimization problem properties that will be used to create the parity checks for the conditions upon which the early termination will happen.

In embodiments, a termination instruction may be included in a classical program that is provided alongside the quantum computer program (or quantum circuit). The user may specify the conditions (e.g., a parity check producing an incorrect outcome). The classical program may process the measurement outcomes and, based on them, may send the "terminate" instruction to the quantum computer.

Figure 1:
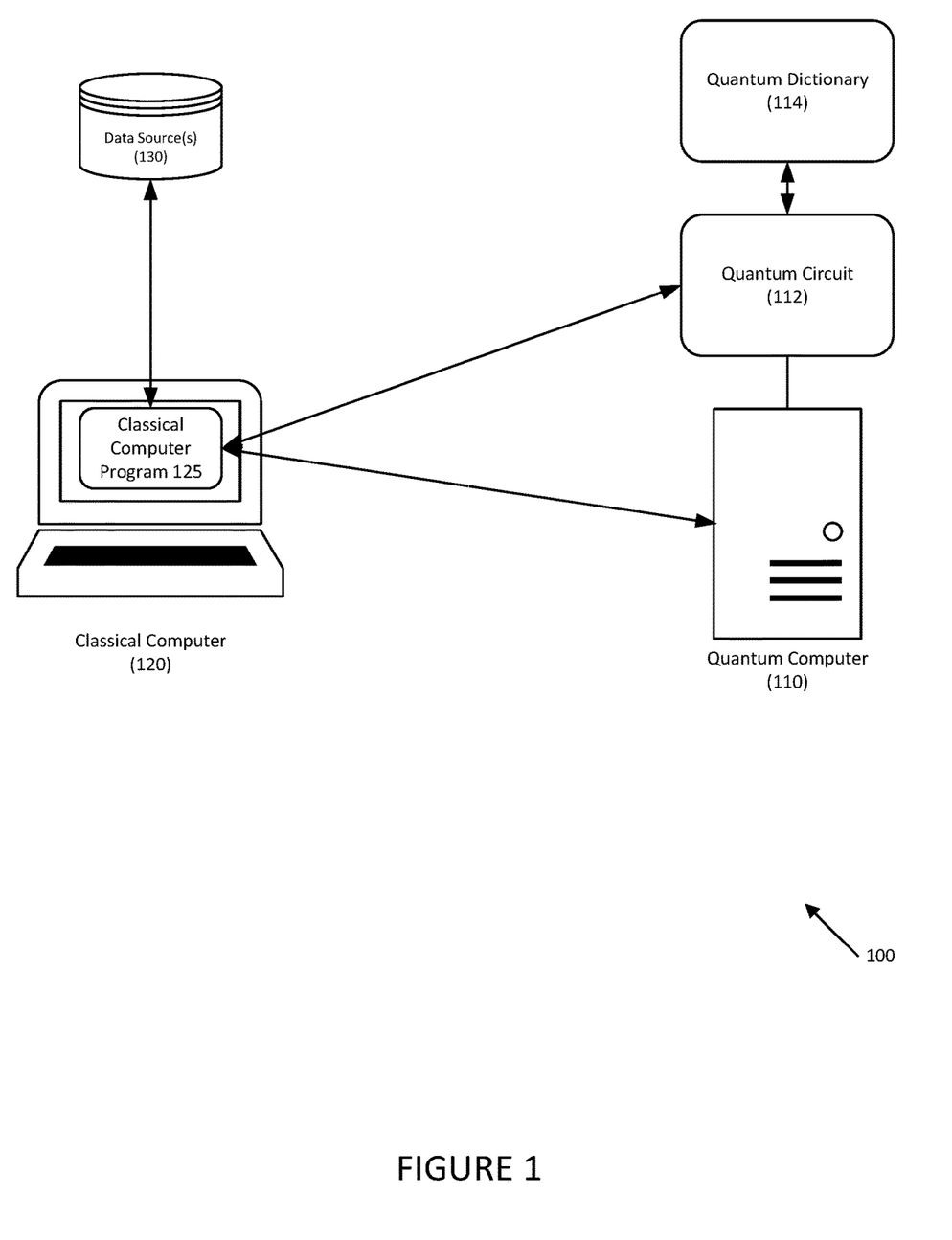
FIG. 1 depicts a system for efficient error mitigation in quantum circuit execution using parity checks and classical feedback according to one embodiment.

Referring to FIG. 1, a system for efficient error mitigation in quantum circuit execution using parity checks and classical feedback is disclosed according to an embodiment. System 100 may include quantum computer 110 that may execute quantum circuit 112. Quantum computer 110 may be a device that performs quantum computations, such as those based on the collective properties of quantum states including superposition, interference, and entanglement. Quantum dictionary 114 may include a plurality of quantum computing patterns. Examples of quantum dictionaries are provided in U.S. Provisional Patent Application Ser. No. 63/055,688 filed Jul. 23, 2020, and in Gilliam, et al., "Foundational patterns for efficient quantum computing" (2019), available at arXiv: 1907.11513, the disclosures of which are hereby incorporated by reference in their entireties.

Quantum dictionary 114 may replace the manual creation of the quantum state with an automated process, and may create a quantum data structure that is capable of representing multiple problem sets. By standardizing the encoding manner, oracles may also be standardized, making it more efficient.

Classical computer 120 may be any suitable general purpose computing device, including servers, workstations, desktop, notebook, laptop, or tablet computers, etc. For example, classical computer 120 may be a microprocessor-based device. Classical computer 120 may interface with quantum circuit 112 using classical computer program 125, which may provide input to, and receive output from, quantum computer 110. In one embodiment, classical computer program 125 may generate one or more quantum circuits 112, may transpile the quantum circuit(s) 112 to machine-readable instructions, and may then send the transpiled circuit(s) 112 to quantum computer 110 for execution. Classical computer program 125 may also select one or more quantum dictionary patterns from quantum dictionary 114 and may provide the quantum dictionary pattern(s) to quantum computer 110. Classical computer program 125 may also receive the results of the execution of the one or more quantum circuits 112.

In one embodiment, classical computer program 125 may include logic to cause the execution of the quantum circuit to stop in certain circumstances. In one embodiment, classical computer program 125 may receive measurements of the parity of a state of a quantum circuit during the execution of a quantum optimization algorithm. The measurements may be performed by quantum circuit 112. For example, classical computer program 125 may receive measurements of the Dicke state during execution of the Quantum Approximate Optimization Algorithm (QAOA) after each step. An example of the QAOA is described in Farhi, Edward et al., "A Quantum Approximate Optimization Algorithm," (2014) available at arxiv.org/abs/1411.4028, the disclosure of which is hereby incorporated, by reference, in its entirety.

In another embodiment, classical computer program 125 may receive measurements for a parity of a quantum state before and after execution of a unitary by measuring an ancilla bit. And in another embodiment, classical computer program 125 may receive measurements of an operator composed of a tensor product of single-qubit Pauli Z operators (e.g., $\otimes_i Z_i$) for each integer variable in a one-hot encoded optimization problem periodically (e.g., after each step of the execution of the quantum optimization algorithm).

If classical computer program 125 identifies an error in a measurement, it may stop execution of the quantum circuit by the quantum computer, thereby saving quantum computing resources. For example, the quantum circuit may include an exit instruction that causes the quantum computer to stop execution of the quantum circuit.

In one embodiment, more than one classical computer program 125 may be provided. For example, a first classical computer program 125 may receive the quantum computer program, transpile the quantum computer program into a quantum circuit, and provide the quantum circuit to quantum computer 110, and a second classical computer program 125 may receive measurements from quantum computer 110, determine whether the measurements indicate an error, and communicate an instruction to terminate execution of the quantum circuit as needed.

Data source(s) 130 may include one or more sources of data. For example, data source(s) 130 may provide input data, such as the problem to be solved (e.g., an optimization problem), an identification of the desired quantum computer 110 to execute quantum circuit 112, information on quantum computer 110 (e.g., the number of qubits, fidelity, etc.).

Figure 2:
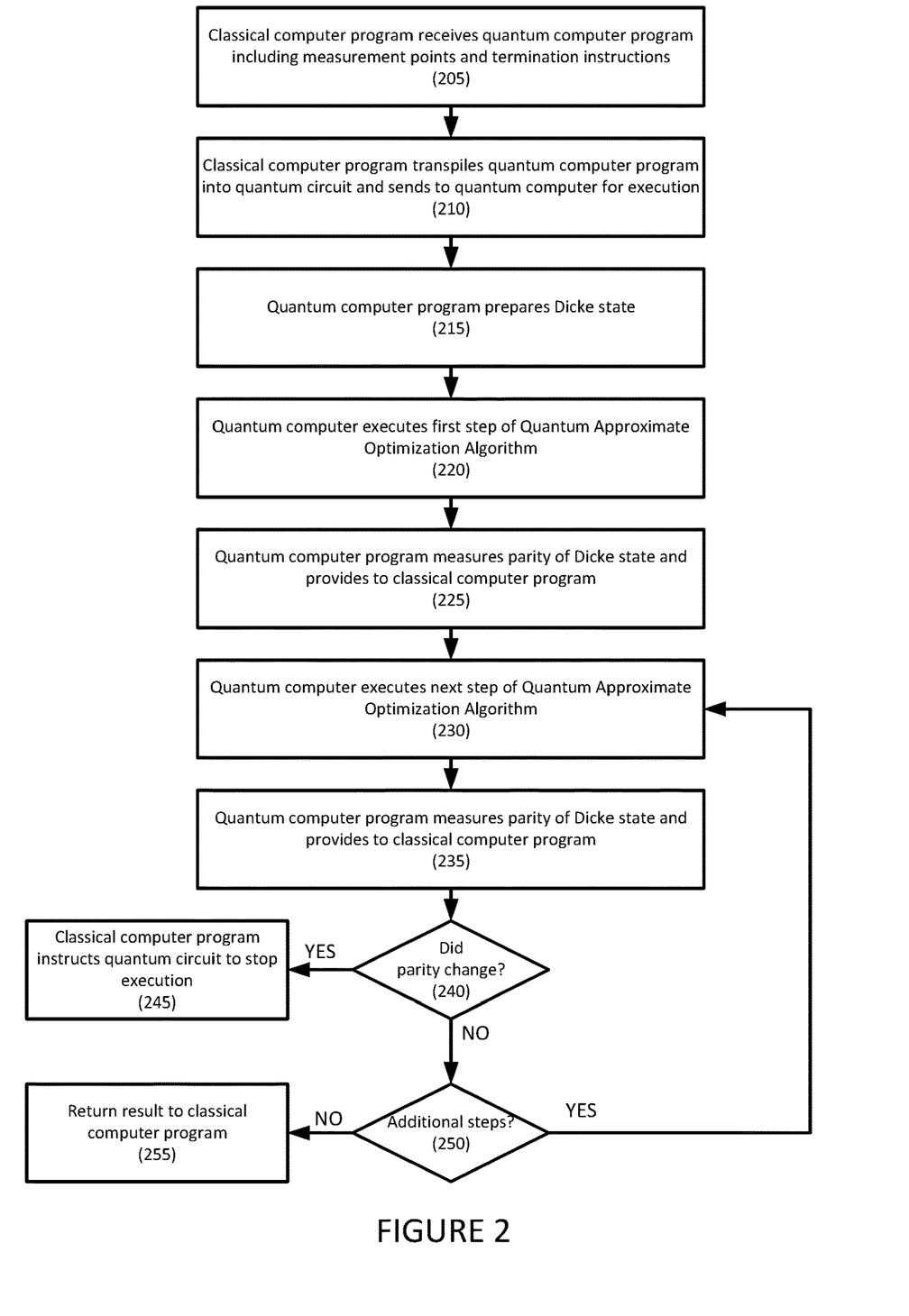
FIG. 2 depicts method for efficient error mitigation in quantum circuit execution using parity-based state verification according to one embodiment.

Referring to FIG. 2, a method for efficient error mitigation in quantum circuit execution using parity-based state verification is disclosed according to one embodiment. Optimization problems often include constraints, such as a constraint on a variable that is included in the output set. For example, in a portfolio optimization problem, there may be a constraint on the number of assets that may be included in a final portfolio. Thus, embodiments may fix a variable, resulting in a constrained optimization problem.

For example, constraints may be enforced in the quantum circuit through the selection of the operations that are included in the quantum circuit. In the case of quantum optimization algorithm, the central operations may be the initial state preparation operator (e.g., preparation of the Dicke state) and the mixer operator (e.g., the XY mixer). An example of the XY mixer is disclosed in Hadfield et al., "From the quantum approximate optimization algorithm to a quantum alternating operator ansatz." Algorithms 12(2) (2019) available at doi.org/10.3390/a12020034), the disclosure of which is hereby incorporated, by reference, in its entirety.

In step 205, a classical computer program may receive a quantum computer program for an optimization problem. In one embodiment, the quantum computer program may include measurement points for measuring a parity of the Dicke state and termination instructions for terminating execution of the quantum circuit.

In step 210, the classical computer may transpile the quantum computer program into a quantum circuit and may provide the quantum circuit to a quantum computer for execution.

In step 215, the quantum computer may prepare a quantum state, such as a Dicke state. The Dicke state is a linear superposition of states with a given Hamming weight $\psi_d \propto \Sigma_{x \in \{0,1\}^n : |x|=d} |x\rangle$.

In step 220, the quantum computer may execute a first step of the quantum optimization algorithm with a mixer, such as an XY mixer or any other Hamming Weight preserving mixer. For example, for the QAOA, the quantum circuit may include three operations: initial state preparation, phase operator, and the mixer operator. The phase and mixer operator are repeated, with pair of operators forming a "layer". The mixers "mix" probability amplitudes and are required for non-trivial dynamics.

In step 225, the quantum computer program may measure a parity of the Dicke state (+1 if even, −1 otherwise) and return the measurement to the classical computer program. In one embodiment, an operator composed of a tensor product of single-qubit Pauli Z operators (e.g., $\otimes_i Z_i$) may be measured.

For example, to perform the measurement, the quantum computer program may initialize an auxiliary qubit (e.g., an ancilla) in the |0⟩ state, apply a Hadamard gate, apply the operator composed of a tensor product of single-qubit Pauli Z operators (e.g., $\otimes_i Z_i$) on the auxiliary qubit, apply a Hadamard gate a second time, and then measure the auxiliary qubit. The measurement of the auxiliary qubit may be returned to the classical computer program.

In step 230, the quantum computer program may execute a next step (e.g., a second step, a third step, etc.) of the quantum optimization algorithm.

In step 235, the quantum computer program may measure a parity of the Dicke state (+1 if even, −1 otherwise) and return the measurement to the classical computer program. This may be similar to step 225, above.

In step 240, the classical computer program may review the measurements to see if the parity has changed. If the parity has changed, indicating an error, in step 245 the classical computer program may instruct the quantum circuit to stop execution of the quantum circuit by, for example, instructing the quantum circuit to execute a termination instruction.

If the parity has not changed, in step 250, a check is made to see if there are additional steps remaining in the quantum optimization algorithm execution. If there are, the process returns to step 230, and the quantum computer continues executing the quantum program.

If there are no additional steps to execute, in step 255, the results of the quantum optimization algorithm are returned to the classical computer program.

Figure 3:
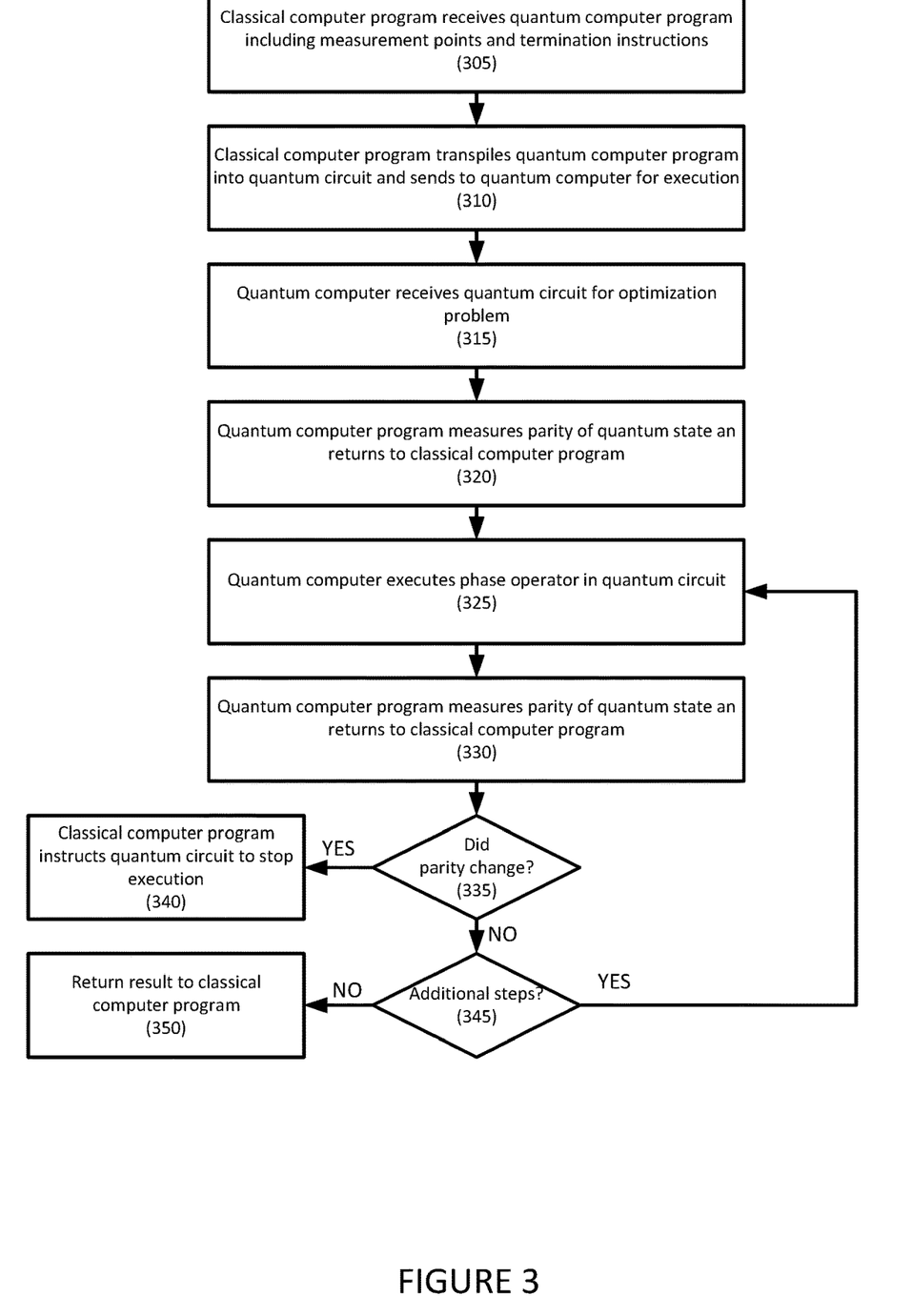
FIG. 3 depicts a method for efficient error mitigation in quantum circuit execution using symmetry-based unitary verification according to one embodiment.

Referring to FIG. 3, a method for efficient error mitigation in quantum circuit execution using symmetry-based unitary verification is disclosed according to another embodiment. The quantum steps applied iteratively as a part of the optimization procedure exhibit certain symmetries. For instance, in quantum optimization algorithm, the "phase operator" uses many two-qubit gates that are susceptible to noise. The phase operator, however, preserves the parity (or the number of ones) in any quantum state. Thus, embodiments measure the parity of the quantum state before and after the phase operator is executed. If the parity changes, execution is stopped, and an error is returned to the classical computer program.

An example of such measurements is provided in Alvin Gonzales et al., "Quantum Error Mitigation by Pauli Check Sandwiching" (2022) available at arXiv:2206.00215, the disclosure of which is hereby incorporated, by reference, in its entirety In step 305, a classical computer program may receive a quantum computer program for an optimization problem. In one embodiment, the quantum computer program may include measurement points for measuring a parity of the quantum state and termination instructions for terminating execution of the quantum circuit.

In step 310, the classical computer may transpile the quantum computer program into a quantum circuit and may provide the quantum circuit to a quantum computer for execution.

In step 315, the quantum computer may receive the quantum circuit from the classical computer program.

In step 320, the quantum computer program may measure the parity of the quantum state, for example, measuring the auxiliary qubit. Measuring the auxiliary qubit ensures that the operator does not introduce any parity-violating errors. In one embodiment, the auxiliary qubit (e.g., ancilla) may be measured. The measurement of the auxiliary qubit may be returned to the classical computer program.

In step 325, the quantum computer executes a phase operator in the quantum circuit. The phase operator is a product of ZZ gates, and thus cannot change parity that is measured by the operator composed of a tensor product of single-qubit Pauli Z operators (e.g., $\otimes_i Z_i$).

Similarly, the XY mixer commutes with all operators composed of a tensor product of single-qubit Pauli Z operators, operators composed of a tensor product of single-qubit Pauli X operators, and operators composed of a tensor product of single-qubit Pauli Y operators (e.g., $\otimes_i Z_i$, $\otimes_i X_i$, and $\otimes_i Y_i$).

In step 330, the quantum computer program may measure the parity of the quantum state by, for example, measuring the auxiliary qubit. The measurement of the auxiliary qubit may be returned to the classical computer program.

In step 335, the classical computer program may review the measurements to see if the parity has changed. If the parity has changed, indicating an error, in step 340 the classical computer program may instruct the quantum circuit to stop execution of the quantum circuit by, for example, instructing the quantum circuit to execute a termination instruction.

If the parity has not changed, in step 345, a check is made to see if there are additional steps remaining to execute. If there are, the process returns to step 325.

If there are no additional steps to execute, in step 350, the results of the execution are returned to the classical computer program.

Figure 4:
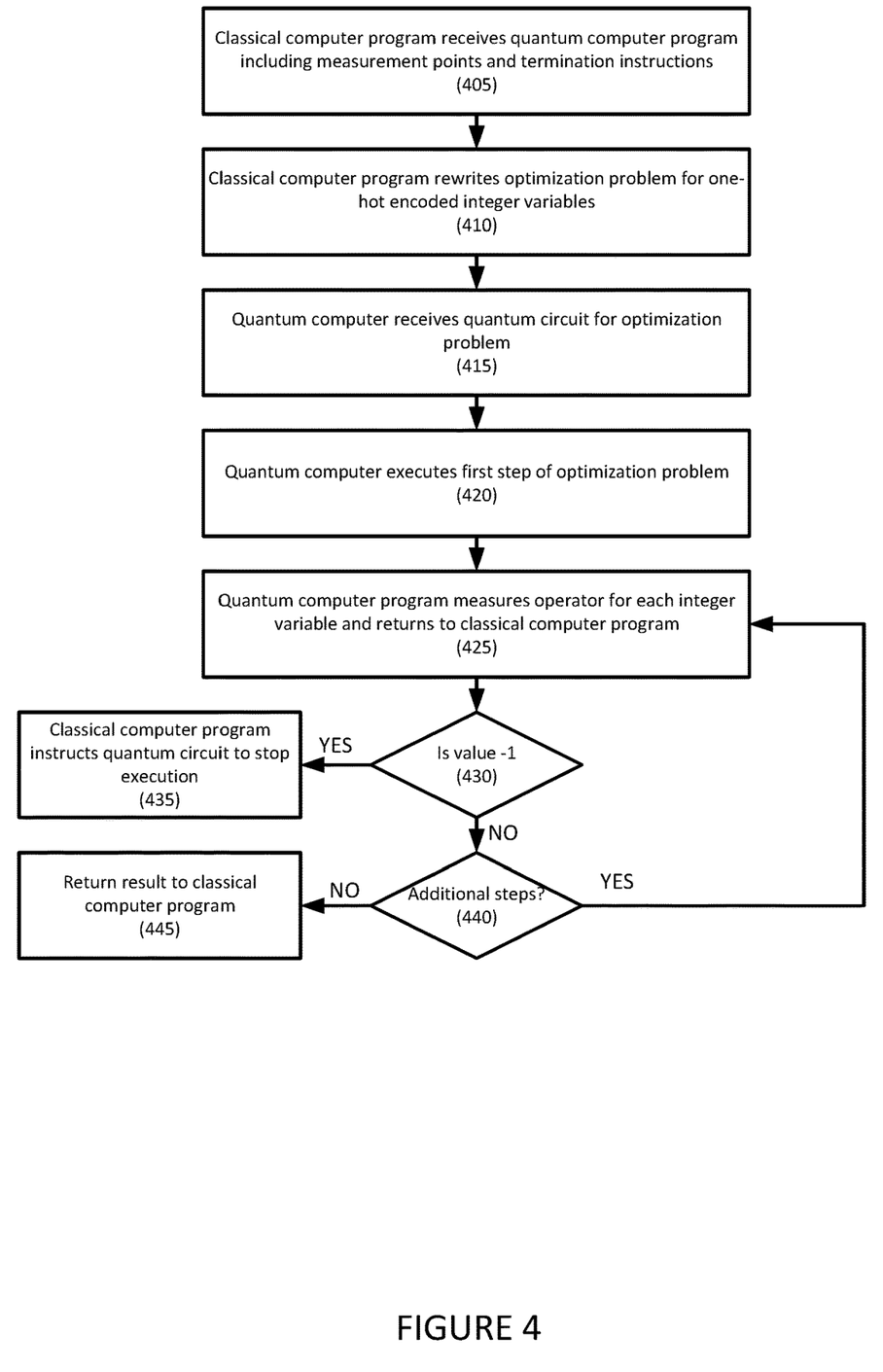
FIG. 4 depicts a method for efficient error mitigation in quantum circuit execution using one-hot encoding verification according to one embodiment.

Referring to FIG. 4, a method for efficient error mitigation in quantum circuit execution using one-hot encoding verification is disclosed according to another embodiment. Instead of using binary optimization to solve an optimization problem, integer solutions may use one-hot encoding to solve the optimization problem.

The quantum optimization algorithm optimization procedure takes place in this encoded representation. Because noise can corrupt the one-hot encoding, after each quantum optimization algorithm step, a check is made to ensure that the one-hot encoding is preserved.

In step 405, a classical computer program may receive a quantum computer program for an optimization problem. In one embodiment, the quantum computer program may include measurement points for measuring a parity the integer variables and termination instructions for terminating execution of the quantum circuit.

The classical computer program may use one-hot encoding to represent integers. For example, 0 may be encoded as |1000⟩, 1 may be encoded as |0100⟩, 2 may be encoded as |0010⟩, and 3 may be encoded as |0001⟩.

In step 410, the classical computer program may rewrite the integer optimization problem by encoding the integer variables into binary variables using the one-hot encoding. For example, a portfolio optimization problem may be rewritten as maximize $\mu \cdot x - \lambda x^T \Sigma x$ with $x \in \{0,1,2,3\}^N$ and $\mu$, $\Sigma$, $\lambda$ representing the "return" vector, the "risk" covariance matrix, and the "risk-tolerance" parameter, respectively.

In step 415, the classical computer program may provide the quantum circuit with the rewritten optimization problem to a quantum computer.

In step 420, the quantum computer may execute a first step of a quantum optimization algorithm, such as the QAOA.

In step 425, the quantum computer program may measure the parity using, for example, an operator composed of a tensor product of single-qubit Pauli Z operators ($\otimes_i Z_i$) for each integer variable. A state that is properly encoded will return a value of −1. The measurement of the auxiliary qubits may be returned to the classical computer program.

In step 430, if any of the measurements of the auxiliary qubits is a value other than −1, indicating an error, in step 435, the classical computer may instruct the quantum circuit to stop execution of the quantum circuit by, for example, instructing the quantum circuit to execute a termination instruction.

If the value is −1, in step 440, a check is made to see if there are additional steps remaining in the quantum optimization algorithm execution. If there are, the process returns to step 420.

If there are no additional steps to execute, in step 445, the results of the quantum optimization algorithm are returned to the classical computer program.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer, etc. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for efficient error mitigation in quantum circuit execution, comprising:
   executing, by a quantum computer, a quantum circuit for a quantum optimization algorithm, the quantum circuit comprising a plurality of measurement points for measuring a parity of a quantum state, and termination instructions for stopping execution of the quantum optimization algorithm;
   preparing, by the quantum computer, the quantum state;
   executing, by the quantum computer, a first step of the quantum optimization algorithm;
   measuring, by the quantum computer, a first parity of the quantum state;
   returning, by the quantum computer, the first parity to a classical computer program;
   executing, by the quantum computer, a second step of the quantum optimization algorithm;
   measuring, by the quantum computer, a second parity of the quantum state;
   returning, by the quantum computer, the second parity to the classical computer program, wherein the classical computer program is configured to compare the first parity and the second parity;
   receiving, by the quantum computer, an instruction to execute the termination instructions from the classical computer program in response to first parity and the second parity being different; and
   executing, by the quantum computer, the termination instructions.

2. The method of claim 1, wherein the quantum state is a Dicke state.

3. The method of claim 1, wherein the quantum computer measures the first parity and the second parity by:
   initializing an auxiliary qubit;
   applying a Hadamard gate;
   applying a control on the auxiliary qubit;
   applying a Hadamard gate a second time; and
   measuring the auxiliary qubit.

4. The method of claim 1, wherein the quantum optimization algorithm comprises the Quantum Approximate Optimization Algorithm.

5. The method of claim 1, further comprising:
   continuing to execute, by the quantum computer, the quantum optimization algorithm in response to the first parity of the quantum state and the second parity of the quantum state being the same.

6. A method for efficient error mitigation in quantum circuit execution, comprising:
   executing, by a quantum computer, a quantum circuit for a quantum optimization algorithm, the quantum circuit comprising a plurality of measurement points for measuring a parity of a quantum state, and termination instructions for stopping execution of the quantum optimization algorithm;
   measuring, by the quantum computer, a first parity of the quantum state;
   returning, by the quantum computer, the first parity to a classical computer program;
   executing, by the quantum computer, a phase operator;
   measuring, by the quantum computer, a second parity of the quantum state;
   returning, by the quantum computer, the second parity to the classical computer program, wherein the classical computer program is configured to compare the first parity and the second parity;
   receiving, by the quantum computer, an instruction to execute the termination instructions from the classical computer program in response to first parity and the second parity being different; and
   executing, by the quantum computer, the termination instructions.

7. The method of claim 6, wherein the phase operator comprises a product of ZZ gates.

8. The method of claim 6, wherein the first parity of the quantum state and the second parity of the quantum state are measured by an operator comprising a tensor product of single-qubit Pauli Z operators.

9. The method of claim 6, wherein the quantum optimization algorithm comprises the Quantum Approximate Optimization Algorithm.

10. The method of claim 6, further comprising:
    continuing to execute, by the quantum computer, the quantum optimization algorithm in response to the first parity of the quantum state and the second parity of the quantum state being unchanged.

11. A method for efficient error mitigation in quantum circuit execution, comprising:
    executing, by a quantum computer, a first step in a quantum optimization algorithm comprising measurement points for measuring a parity of integer variable states and termination instructions for stopping execution of the quantum optimization algorithm, wherein integers in the quantum optimization algorithm are represented using one-hot encoding;
    measuring, by the quantum computer, a parity for each of the integer variables;
    returning, by the quantum computer, the parities to a classical computer program, wherein the classical computer program is configured to evaluate the parities;
    receiving, by the quantum computer, an instruction to execute the termination instructions from the classical computer program in response to one of the parities having a value other than a first value; and
    executing, by the quantum computer, the termination instructions.

12. The method of claim 11, wherein the value is −1.

13. The method of claim 11, wherein the quantum optimization algorithm comprises the Quantum Approximate Optimization Algorithm.

14. The method of claim 11, wherein the parity for each of the integer variables is measured using an operator comprising a tensor product of single-qubit Pauli Z operators.

15. The method of claim 11, further comprising:
    continuing to execute, by the quantum computer, the quantum optimization algorithm in response to the parities having the first value.

* * * * *